(12) United States Patent
Kameda et al.

(10) Patent No.: US 8,815,440 B2
(45) Date of Patent: Aug. 26, 2014

(54) BATTERY COVER MEMBER

(75) Inventors: Yoshiaki Kameda, Aichi-ken (JP); Yasunori Uchida, Aichi-ken (JP); Tadanobu Ota, Toyota (JP); Hikohito Yamazaki, Toyota (JP); Takashi Harayama, Toyota (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 357 days.

(21) Appl. No.: 12/891,302

(22) Filed: Sep. 27, 2010

(65) Prior Publication Data

US 2011/0076553 A1 Mar. 31, 2011

(30) Foreign Application Priority Data

Sep. 29, 2009 (JP) ................. 2009-223893

(51) Int. Cl.
*H01M 2/22* (2006.01)
*H01M 2/04* (2006.01)
*H01M 2/08* (2006.01)
*H01M 2/30* (2006.01)
*H01M 2/06* (2006.01)
*H01M 10/0525* (2010.01)

(52) U.S. Cl.
CPC ............. *H01M 2/30* (2013.01); *Y02T 10/7011* (2013.01); *H01M 2/043* (2013.01); *Y02E 60/12* (2013.01); *H01M 2/08* (2013.01); *H01M 2/0469* (2013.01); *H01M 10/0525* (2013.01); *H01M 2/0491* (2013.01); *H01M 2/0482* (2013.01); *H01M 2/22* (2013.01); *H01M 2/06* (2013.01)
USPC ........................................................ 429/181

(58) Field of Classification Search
USPC .......................................................... 429/181
See application file for complete search history.

(56) References Cited

U.S. PATENT DOCUMENTS

2006/0063068 A1 3/2006 Cheon et al.

FOREIGN PATENT DOCUMENTS

| JP | 2003246522 A | 9/2003 | |
| JP | 200693122 A | 4/2006 | |
| JP | 2008027823 A * | 2/2008 | .............. H01M 2/06 |
| JP | A-2008-27823 | 2/2008 | |
| JP | 2008098012 A | 4/2008 | |
| JP | 2008192595 A | 8/2008 | |
| JP | 2009048969 A | 5/2009 | |
| WO | WO 2010095224 A1 * | 8/2010 | .............. H01M 2/06 |

OTHER PUBLICATIONS

Office Action mailed Jun. 17, 2013 in the corresponding JP application No. 2009-223893 (English translation).
Office action issued on Feb. 17, 2013 in the corresponding Chinese patent application No. 201010295870.8 and an English translation thereof.

* cited by examiner

*Primary Examiner* — Karie O'Neill Apicella
(74) *Attorney, Agent, or Firm* — Posz Law Group, PLC

(57) ABSTRACT

A battery cover member (10) of the present invention includes a metallic electrode terminal (40), a metallic cover member (30) having through holes (32), and an insulating resin member (50), in which the electrode terminals inserted into the through hole and the cover member are integrally bonded together by the insulating member, wherein at least a sealing area (70) of the electrode terminal that adheres to the insulating member is formed as a columnar shape or an elliptically columnar shape.

13 Claims, 4 Drawing Sheets

FIG. 5A    FIG. 5B    FIG. 5C
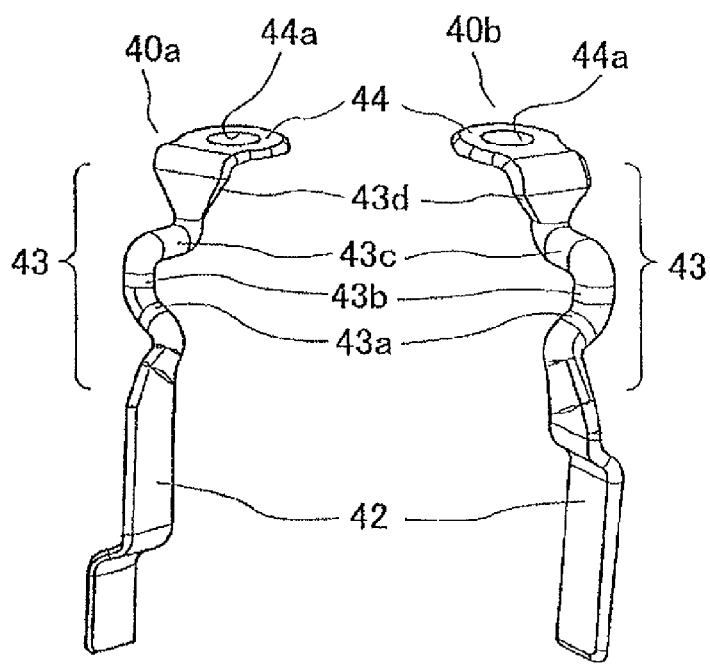
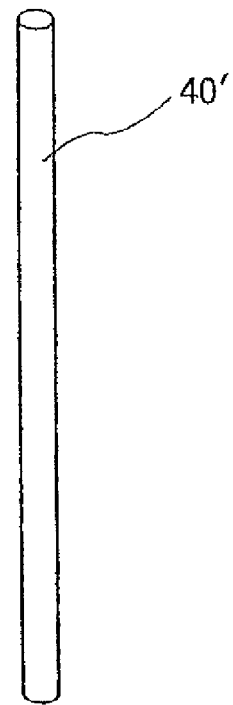
FIG. 6
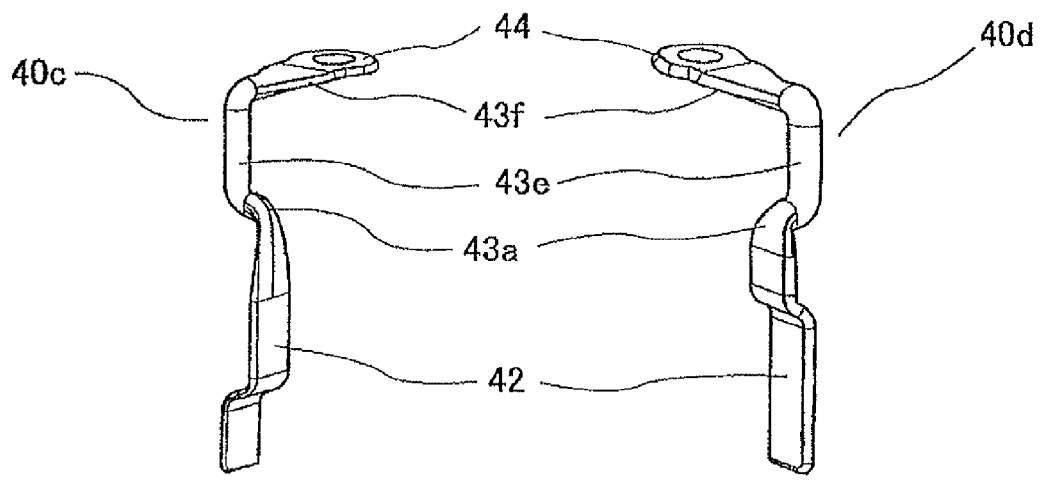

BATTERY COVER MEMBER

BACKGROUND

1. Field of the Invention

The present invention relates to a battery cover member that has a cover member through which electrode terminals penetrate and that seals an opening of a battery container.

2. Description of the Related Art

A lithium ion secondary battery that has high capacity, produces a high power, and also exhibits high energy density has recently received attention as an electronic power source for a portable electronic device and a power source for a pure electric vehicle.

The lithium ion secondary battery is built by sealing a roll electrode member serving as a power generation member in a battery container along with a non-aqueous electrolyte. Incidentally, if moisture enters the battery container, the moisture will react with the non-aqueous electrolyte, thereby generating a fluorinated acid. The thus-generated fluorinated acid eats into electrodes, which in turn sometimes results in deterioration of battery performance, such as battery capacity and battery life.

For these reasons, a battery container of the lithium ion secondary battery is formed from metal so as to prevent entry of moisture into the battery container. The metallic battery container must keep a sealing characteristic between an interior and an exterior of the battery container. The battery container is configured such that clearance between a cover member and electrode terminals penetrating through the cover member, to thus project to the outside from the interior of the battery is sealed by use of an O-ring.

However, a sealing structure using an O-ring entails a large number of components and, hence, poses a problem in terms of productivity and cost. In order to solve such a problem, Patent Document 1 provides a proposal of a battery cover member that bonds an upper battery cover to electrode terminals by means of a resin sealing insulation member, thereby combining the upper battery cover and the electrode terminals in one unit and that ensures a sealing characteristic between the interior and the exterior of the battery. As shown in FIG. 8, the battery cover member 110 is made up of a cover member 130 and a pair of electrode terminals 140, and the pair of electrode terminals 140 inserted into through holes made in the cover member 130 are assembled into a mold. A space between the cover member 130 and the electrode terminals 140 are filled with a molten resin insulating sealing member 150, thereby integrating the cover member and the electrode terminals into one unit by means of insert molding. Since the cover member 130 and the electrode terminals 140 are hardly bonded into one unit by way of the resin insulating sealing member 150, the battery cover member 110 exhibits a high sealing characteristic.

However, metal and a resin differ from each other in terms of a coefficient of thermal expansion. Therefore, stress develops in an adhesive interface between the metal and the resin in a high-temperature or low-temperature environment, which in turn impairs adhesion of the electrode terminal 140 to the resin insulating sealing member 150, induces cracks in the resin insulating sealing member 150, and fails to assure the sealing characteristic of the battery cover member 110. Since the electrode terminals 140 of the battery cover 110 assumes a rectangular cross sectional profile as shown in FIG. 8, a corner is particularly likely to become a starting point of cracks due to stress concentration. Further, in a case where electrode terminals are subjected to surface treatment in order to enhance adhesion, when the electrode terminal has a rectangular cross section, generating a coating film by means of surface treatment changes from a linear portion to an angular portion, which makes it difficult to subject an entire adhesion surface between the electrode terminal and an insulation sealing member to uniform surface treatment over the entire circumference. Furthermore, since an adhesion area includes both linear and angular portions, there also arises another problem of operation of an inspection apparatus becoming difficult.

Patent Document 1: JP-A-2008-27823

The present invention has been conceived in light of the above-mentioned circumstance, and a challenge to be met by the present invention is to provide a battery cover member into which electrode terminals and a cover member are integrally bonded into a single unit by means of a corresponding insulating resin member and that exhibits superior adhesion between electrode members and the insulating resin member.

SUMMARY OF THE INVENTION

In order to solve the problem, a battery cover member of the present invention includes a metallic electrode terminal, a metallic cover member having a through hole, and an insulating resin member, in which the electrode terminal inserted into the through hole and the cover member are integrally bonded by the insulating member, wherein at least a sealing area of the electrode terminal adhering to the insulating member is formed as a columnar shape or an elliptically columnar shape.

In the battery cover member of the present invention, the electrode terminal is preferably integrally formed from one columnar rod member by plastic processing. The electrode terminal can have a flat-plate-shaped collector terminal connected to an electrode member, a flat-plate-shaped external terminal connected to a connect member, and a joint that is formed into a shape of a three-dimensional line of flexure and that connects the collector terminal to the external terminal.

In the battery cover member of the present invention, an adhesion area of the electrode terminal bonded to the insulating resin member is formed into a corner-free shape having a columnar or elliptically columnar cross sectional profile over the entire circumference of the adhesion area. Therefore, stress attributable to a difference between thermal expansion of metal and thermal expansion of a resin has built up in the adhesive interface under a high-temperature or low-temperature environment, the stress can be uniformly received over the entire circumference of the adhesion area. Accordingly, no cracks arise in the insulating member, and a superior sealing characteristic is exhibited.

Further, the entire circumference of the sealing surface of the electrode terminal can be subjected to uniform surface treatment, and hence an adhesive interface between the insulating member and the electrode terminal or the cover member can be made further stable.

Since inspecting a state of adhesion of such a columnar adhesion surface is easy, the accuracy of inspection determination can be enhanced.

The electrode terminal of the battery cover member of the present invention can be integrally formed from a single columnar rod member by means of plastic processing. Accordingly, there is no necessity to discard a material except a stamped hole opened in each of the external terminals.

Therefore, when compared with a related art electrode terminal formed from a flat plate by stamping, the electrode terminal of the invention can yield a significant improvement in material yield.

BRIEF DESCRIPTION OF THE DRAWINGS

FIGS. 5A and 5B are oblique perspective views of electrode terminals and FIG. 5C is an oblique perspective view showing a material of the electrode terminals;

FIG. 6 is an oblique perspective view showing a modification of the electrode terminals;

DESCRIPTION OF THE PREFERRED EMBODIMENTS

Figure 1:
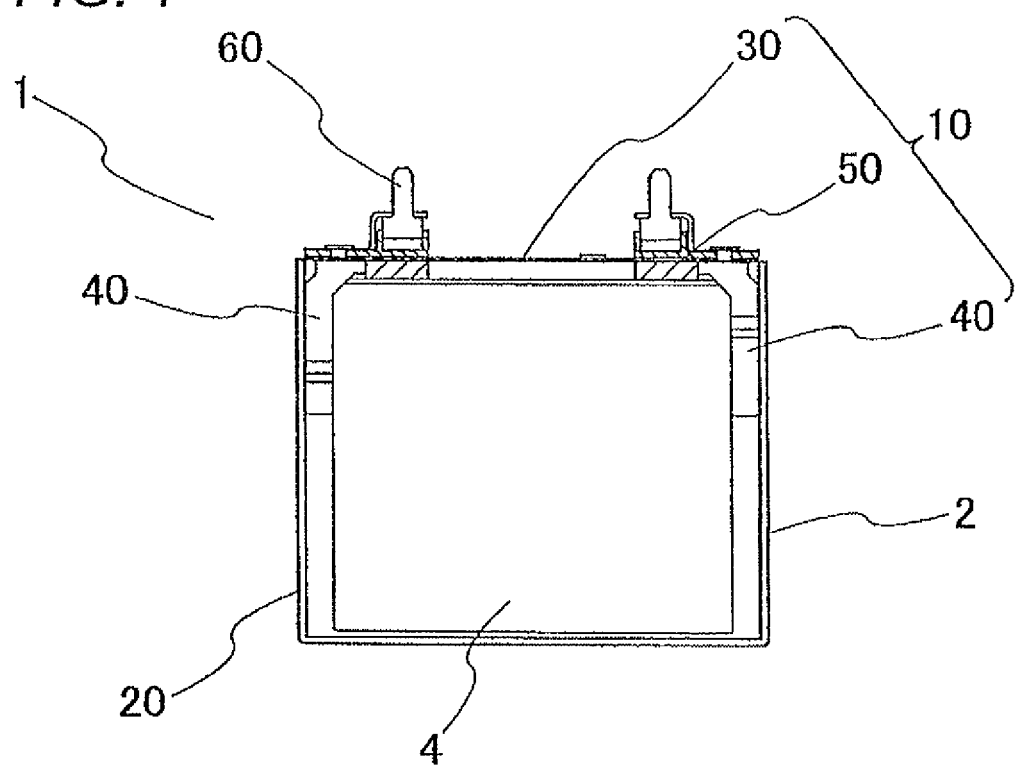
FIG. 1 is a cross sectional schematic view for describing a configuration of a battery having a battery cover member of an embodiment.
Figure 2:
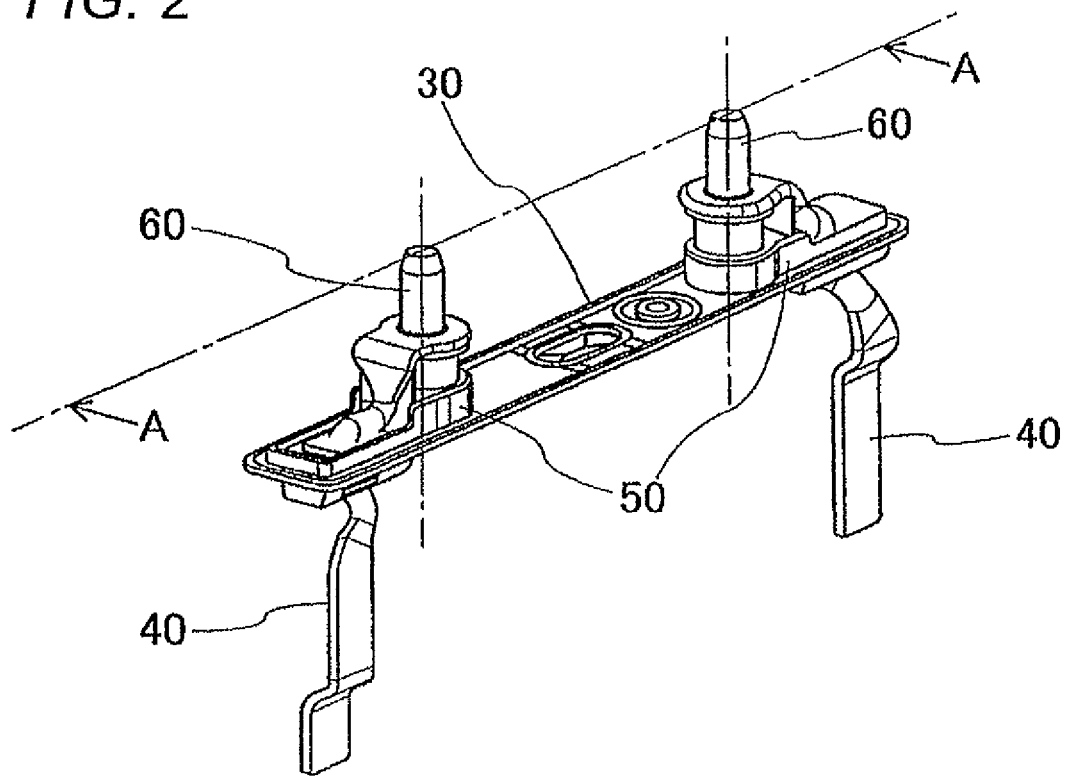
FIG. 2 is an oblique perspective view showing the battery cover member of the embodiment.
Figure 3:
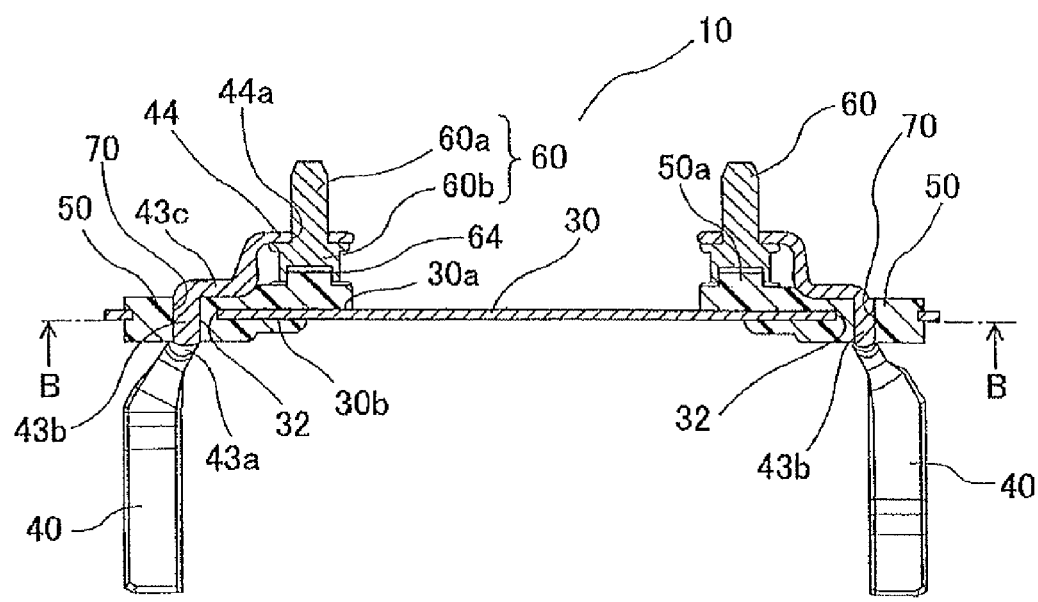
FIG. 3 is a cross sectional view taken along line A-A shown in FIG. 2.

An embodiment of the present invention is hereunder described in detail by reference to the drawings. FIG. 1 is a general schematic view showing a configuration of a lithium ion secondary battery 1 having a battery cover member 10 of a present embodiment. FIG. 2 is an oblique perspective view showing the battery cover member 10 of the present embodiment, and a cross section taken along line A-A is illustrated in FIG. 3. Further, a cross section taken along line B-B shown in FIG. 3 is illustrated in FIG. 4.

As shown in FIG. 1, the lithium ion secondary battery 1 has a substantially rectangular parallelepiped metal container 2; an electrode member 4 housed in the container 2 while rolled flatly; a pair of electrode terminals 40 connected to both axial ends (right and left ends shown in FIG. 1) of the electrode member 4; and a connect member 60 electrically connected to the electrode terminals 40 outside of the container 2. An un-illustrated electrolyte is kept in the container 2, and the electrode member 4 is impregnated with the electrolyte.

The container 2 has a box-shaped container main body 20 having at an upper end thereof an opening and a cover member 30 that is attached to the opening to seal the container main body 20. A pair of terminal attachment holes 32 through which the pair of electrode terminals 40 penetrate are opened in the cover member 30.

Figure 4:
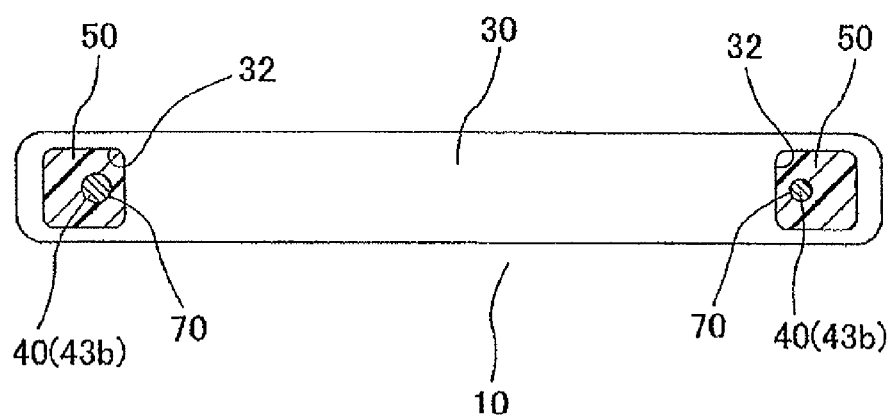
FIG. 4 is a cross sectional view taken along line B-B shown in FIG. 3.

As shown in FIGS. 3 and 4, an insulating member 50 is formed between the electrode terminals 40 and the cover member 30 so as to seal the terminal attachment holes 32 and closely contact the electrode terminals 40 and the cover member 30, thereby combining the electrode terminals 40 and the cover member 30 into a single body and forming the battery cover member 10.

FIG. 5 shows an oblique perspective view showing the electrode terminals 40. FIG. 5A shows an electrode terminal 40a that is a negative electrode, and FIG. 5B shows an electrode terminal 40b that is a positive electrode. The electrode terminal 40a and the electrode terminal 40b assume a substantially identical state. The electrode terminal 40 includes a flat collector terminal 42 that is made on one end of the electrode terminal and that is joined to an end of the electrode member 4, a substantially disc shaped external terminal 44 that is made on the other end of the electrode terminal and that is joined to the connect member 60, and a joint 43 that joins the collector terminal 42 to the external terminal 44 and that assumes the shape of a three-dimensional line of flexure.

The joint 43 includes a first bend 43a extending from an upper end of the collector terminal 42 substantially horizontally along a direction of a short side of the cover member 30; a second bend 43b extending from an end of the first bend 43a upwardly in a substantially vertical direction; a third bend 43c extending from an end of the second bend 43b horizontally along a direction of a long side of the cover member 30; and a rise portion 43d that upwardly extends from an end of the third bend 43c and that is continual to the external terminal 44. Among the portions of the joint 43, the first bend 43a, the second bend 43b, and the third bend 43c each have a columnar shape having a circular cross sectional profile. The second bend 43b penetrates through a center of the terminal attachment hole 32 of the cover member 30 so as to cross the cover member 30 at right angles.

An insert hole 44a that allows insertion of the connect member 60 is opened in the center of the external terminal 44 of the electrode terminal 40. The connect member 60 includes a leg portion 60a and a head portion 60b and is joined to the external terminal 44 such that the leg portion 60a upwardly projects out of the insert hole 44a. Moreover, a cylindrical portion 64 into which a protuberance 50a of the insulating member 50 is inserted is provided on the head portion 60b of the connect member 60.

The insulating member 50 is integrally formed so as to seal the terminal attachment hole 32 as shown in FIG. 4 and fill spacing between the first bend 43a and the third bend 43c of the electrode terminal 40 and the cover member 30 and spacing between the connect member 60 and the cover member 30. Specifically, the insulating member 50 remains in close contact with; at least, a surface of the second bend 43b of the electrode terminal 40, an upper surface 30a and a lower surface 30b of the cover member 30, and a surface of the head portion 60b of the connect member 60.

In the battery cover member 10 configured as mentioned above, at least the second bend 43b of the electrode terminal 40 is made in a columnar shape. Therefore, a columnar adhesive interface having a circular cross sectional profile along which the electrode terminal 40 and the insulating member 50 are bonded together acts as a sealing area 70. In such a sealing structure, metal and a resin securely adhere to each other. Even if stress has built up for reasons of a difference between thermal shrinkage of metal and thermal shrinkage of the resin in the high-temperature or low-temperature environment, the entire circumference of the sealing area 70 can uniformly receive the stress. Accordingly, in terms of a sealing characteristic, the electrode terminal is superior to an electrode terminal that has a corner susceptible to stress concentration; that is made by pressing, or the like; and that has a rectangular cross section.

The electrode terminal 40 of the present embodiment, such as that mentioned above, can be manufactured by subjecting a columnar, metallic rod member 40', which is taken as a material, to plastic processing, as shown in FIG. 5C. For instance, the essential requirement to process the collector terminal 42, the external terminal 44, the rise portion 43d of the joint 43 is to flatten out corresponding areas on the rod member 40'. Further, the joint 43 except the rise portion 43d can be made by bending a corresponding area on the joint 43. Therefore, manufacturing the electrode terminal 40 of the present embodiment does not entail discarding of the material except the insert hole 44a opened in the external terminal 44. Accordingly, when compared with a related art electrode terminal manufactured from a flat plate by pressing, the electrode terminal can yield a significant improvement in material yield.

The battery cover member 10 of the embodiment can be made analogous to the related-art battery cover member except the form of the electrode terminal 40. For instance, metal selected from a group comprising aluminum, an aluminum alloy, copper, and a copper alloy, can be adopted for the electrode terminal 40 and the cover member 30. Both the electrode terminal 40 and the cover member 30 can be made of single type of metal or also from different types of metals. The surface of the electrode terminal 40 and the surface of the cover member 30, which are made of such a metal, are subjected to predetermined surface treatment, whereby a superior adhesive interface can be made between the electrode terminal and the cover member and the insulating member 50.

For instance, engineering plastics, such as polyphenylene sulfide (PPS), polyamide (PA), and polybutylene terephthalate (PBT), can be used for the insulating member 50. An adhesive modifying agent, such as a maleic anhydride modified ethylene copolymer, can be included in the engineering plastics. As a result of including the adhesive modifying agent, the insulating member 50 can exhibit high adhesion and a high sealing characteristic with respect to the electrode terminal 40 and the cover member 30 that have undergone surface treatment by use of a triazine dithiol compound or a silane coupling agent.

For instance, such a battery cover member 10 can be manufactured as follows. First, the electrode terminal 40 and the cover member 30, which are made of metal, are subjected to surface treatment by use of a predetermined surface treatment agent. Next, the electrode terminal 40 subjected to surface treatment is placed in the mold while remaining inserted into the terminal attachment hole 32 of the cover member 30. Subsequently, a resin composition is injected in a fused state into the mold, to thus perform insert molding.

The battery cover member of the invention is not limited to the embodiment mentioned above and may also be changed without departing the gist of the present invention.

For instance, in the present embodiment, the joint 43 of the electrode terminal 40 is made so as to include the first bend 43a, the second bend 43b, the third bend 43c, and the rise portion 43d. However, the joint can also be made like electrode terminals 40c and 40d of a modification shown in FIG. 6.

Figure 7:
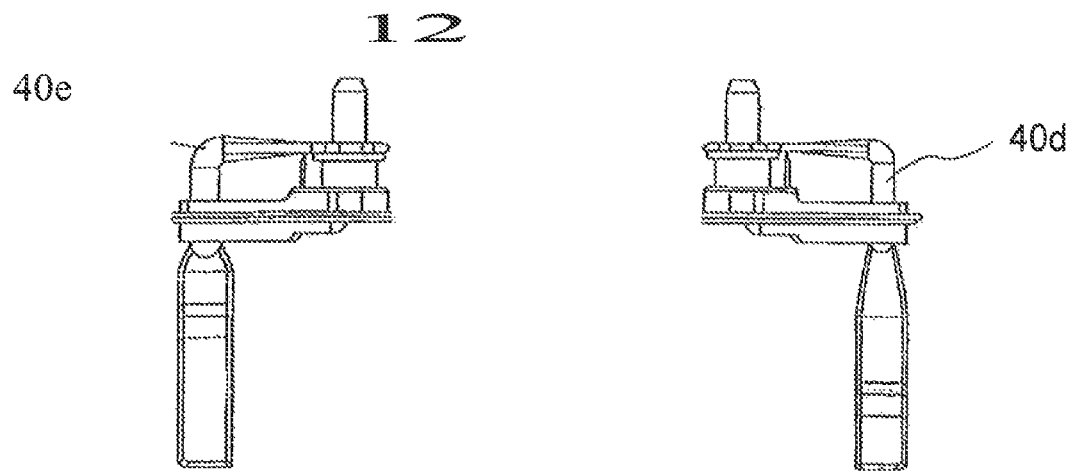
FIG. 7 is a front view of the battery cover member having electrode terminals of the modification.
Figure 8:
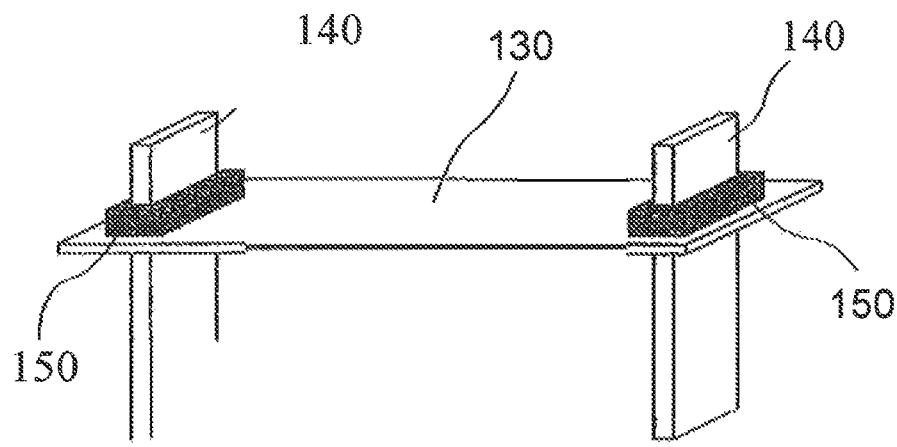
FIG. 8 is an oblique perspective view showing a battery cover member of a related art.

Specifically, the electrode terminals 40c and 40d are formed in such a way that the second bend 43b of the electrode terminal 40a is upwardly extended by an amount corresponding to a rise of the rise portion 43d, to thus be taken as a second bend 43e and that a horizontal connect portion 43f is horizontally extended from an end of the second bend 43e in a longitudinal direction of the cover member 30, to thus connect the external terminal 44. The electrode terminals are thus made, whereby it becomes easy to insert the electrode terminals 40c and 40d into the terminal attachment hole 32 of the cover member 30. Thus, ease of assembly of the battery cover member 12 shown in FIG. 7 is enhanced.

The battery cover member of the present invention is suitable as a battery cover member of an angular sealed battery serving as an electric power source of a portable electronic device and a power source of a pure electric vehicle.

What is claimed is:

1. A battery cover member, comprising:
a metallic electrode terminal; and
a metallic cover member having a through hole and an insulating resin member, in which the electrode terminal inserted into the through hole and the cover member are integrally bonded together by the insulating member,
wherein at least a sealing area of the electrode terminal that adheres to the insulating member has a circular columnar shape or an elliptically columnar shape,
wherein the electrode terminal is integrally formed from one columnar rod member by plastic processing, and
wherein the electrode terminal has a flat-plate-shaped collector terminal connected to an electrode member, a flat-plate-shaped external terminal connected to a connect member, and a joint that is formed into a shape of a three-dimensional line of flexure and that connects the collector terminal to the external terminal.

2. The battery cover member according to claim 1, wherein the insulating member includes an adhesive modifying agent, and the electrode terminal and the cover member both have a coating thereon selected from the group consisting of a triazine dithiol compound and a silane coupling agent.

3. The battery cover member according to claim 1, wherein the battery cover member has an angular shape adapted for use in an angular sealed battery of a power source of an electric vehicle.

4. The battery cover member according to claim 1, wherein the connect member has an indented cylindrical portion, and the insulating member has a protuberance fitting within the indented cylindrical portion of the connect member.

5. The battery cover member according to claim 4, wherein the sealing member is integrally formed and seals the through hole, fills spacing between the electrode terminal and the cover member and fills spacing between the connect member and the cover member.

6. The battery cover member according to claim 1, wherein the sealing area of the electrode terminal that adheres to the insulating member has the circular columnar shape with a circular cross section.

7. The battery cover member according to claim 1, wherein the sealing area of the electrode terminal that adheres to the insulating member has the elliptically columnar shape with an elliptical cross section.

8. A battery cover member, comprising:
a metallic cover member having a through hole;
a metallic electrode terminal passing through the through hole; and
a molded insulating and sealing area comprising a molded resin integrally bonding the metallic cover member and the metallic electrode terminal together and to the molded resin and providing a sealing area uniformly receiving external stress,
wherein at least a sealing part of the electrode terminal within the molded insulating and sealing area has a columnar shape free of corners matching those of a cross section of a rectangular column
wherein the electrode terminal is integrally formed from one columnar rod member by plastic processing, and
wherein the electrode terminal has a flat-plate-shaped collector terminal connected to an electrode member, a flat-plate-shaped external terminal connected to a connect member, and a joint that is formed into a shape of a three-dimensional line of flexure and that connects the collector terminal to the external terminal.

9. The battery cover member according to claim 8, wherein the sealing part of the electrode terminal within the molded insulating and sealing area has one of a circular cross section and an elliptical cross section.

10. The battery cover member according to claim 8, wherein the molded resin of the molded insulating and sealing area includes an adhesive modifying agent, and the electrode terminal and the cover member both have a coating thereon selected from the group consisting of a triazine dithiol compound and a silane coupling agent.

11. The battery cover member according to claim 8, wherein the battery cover member has an angular shape adapted for use in an angular sealed battery of a power source of an electric vehicle.

12. The battery cover member according to claim 8, wherein the connect member has an indented cylindrical portion, and the molded insulating and sealing area has a protuberance fitting within the indented cylindrical portion of the connect member.

13. The battery cover member according to claim 12, wherein the molded insulating and sealing area seals the through hole, fills spacing between the electrode terminal and the cover member and fills spacing between the connect member and the cover member.

* * * * *